United States Patent Office 3,084,026
Patented Apr. 2, 1963

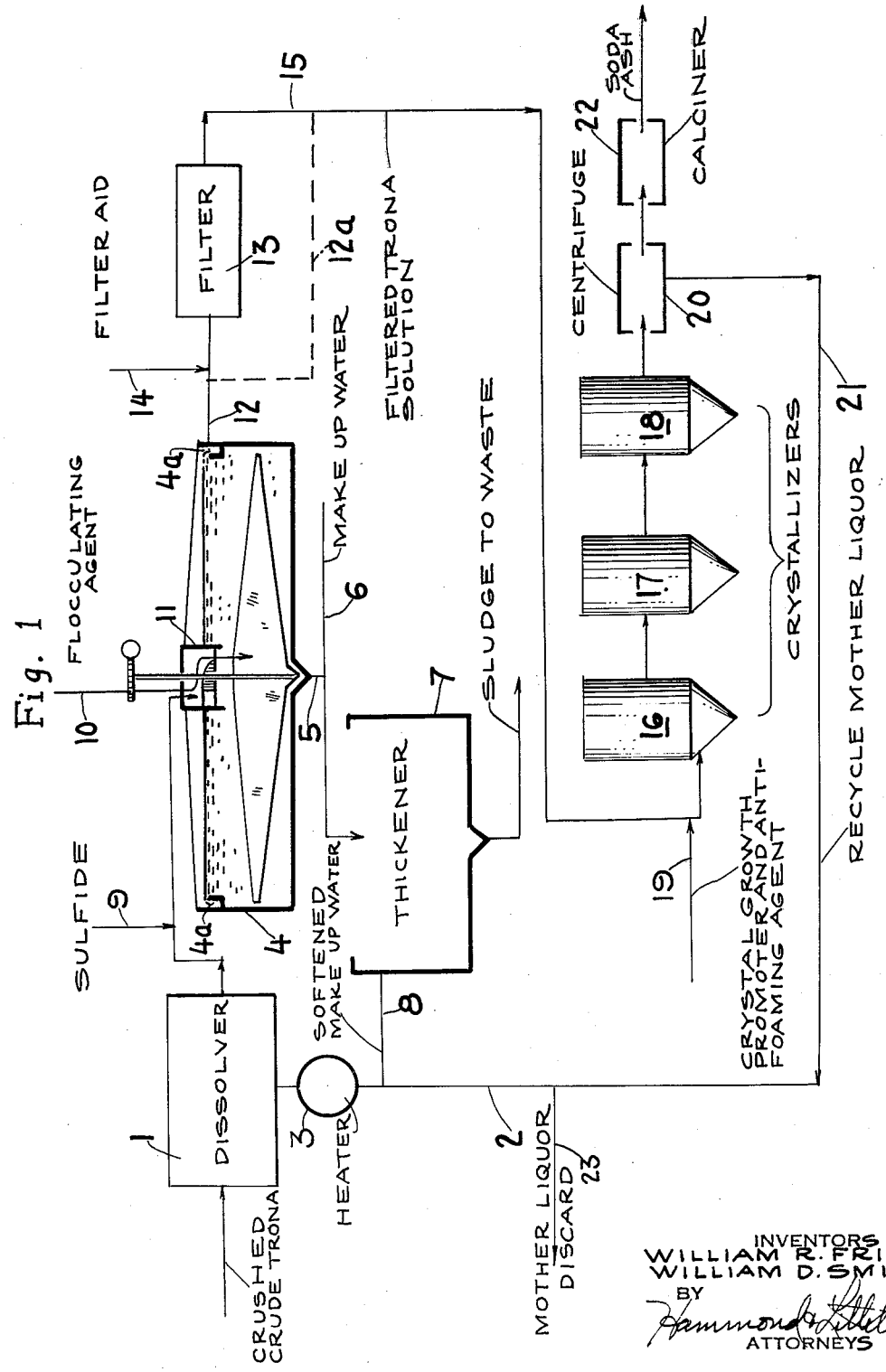

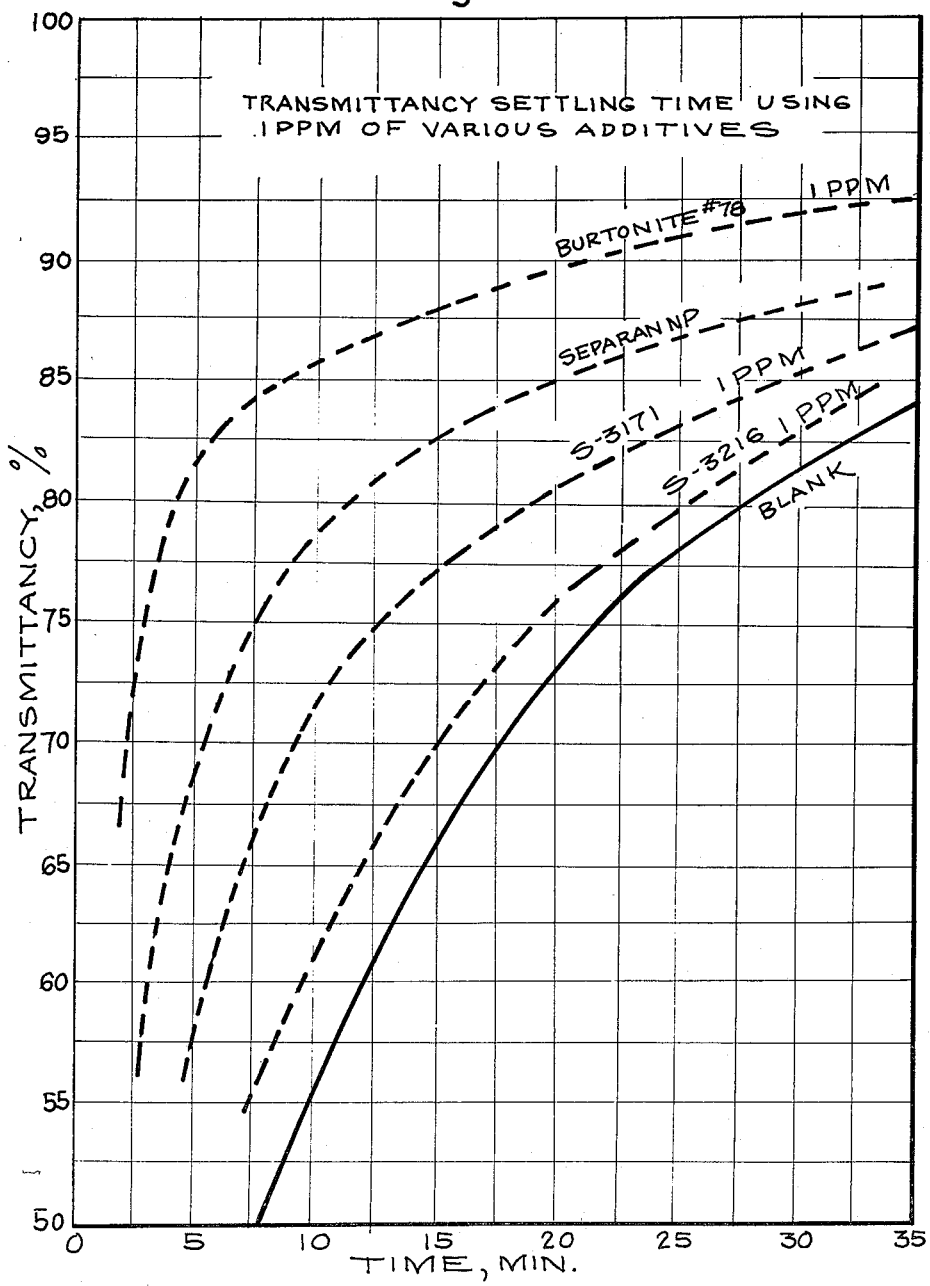

3,084,026
METHOD OF PRODUCING SODA ASH FROM CRUDE TRONA
William R. Frint and William D. Smith, Green River, Wyo., assignors to FMC Corporation, a corporation of Delaware
Filed May 26, 1960, Ser. No. 31,863
8 Claims. (Cl. 23—38)

This invention relates to the production of soda ash from trona, as found in Sweetwater County, Wyoming, and from similar trona deposits found in other parts of the world.

The trona deposits in Sweetwater and adjacent counties in Wyoming are found at a depth of about 1500 to 1800 feet underground and consist of a main trona bed varying from about 8 to about 18 feet in thickness and other beds of smaller thickness. The trona consists mainly of sodium sesquicarbonate ($Na_2CO_3 \cdot NaHCO_3 \cdot 2H_2O$) with about 4 to 6% of insoluble impurities consisting mainly of shale. The shale consists of some relatively coarse particles together with a large amount of minus 200 mesh particles which when the trona is put into solution form a fine slimy dispersion which is difficult to settle or filter from the solution. A typical analysis of the crude trona from which the larger pieces of shale have been removed is:

| Constituent— | Percent |
|---|---|
| $Na_2CO_3$ | 45.11 |
| $NaHCO_3$ | 35.75 |
| $H_2O$ | 15.32 |
| $NaCl$ | 0.03 |
| $Na_2SO_4$ | 0.01 |
| $Fe_2O_3$ (total) | 0.11 |
| Insolubles | 3.75 |

Trona from different parts of the main trona bed will, however, have different amounts of shale and other insolubles therein.

In the usual process of producing soda ash from trona, the trona is mined from the thicker trona bed, brought to the surface, crushed to about minus 8 mesh particle size and dissolved in a hot recirculating trona mother liquor carrying more normal carbonate than bicarbonate so that the sodium carbonate and sodium bicarbonate in the mined trona is dissolved congruently, the insoluble material is first settled out of the solution in clarifiers, the remainder of the insoluble material is removed by filtration, sodium sesquicarbonate is crystallized and separated from the hot solution and calcined to soda ash and the mother liquor remaining after the crystallization is reheated and returned to the dissolving tanks to dissolve more trona and go again through the recovery cycle.

To maintain design production in a plant designed to produce 1,400 tons of soda ash per day, a flow rate of 1,200 gallons per minute through each of the parallel lines of dissolvers, clarifiers and crystallizers is required. With this flow rate it has been difficult to produce properly clarified solutions in the clarifiers and the amount of insolubles in the clarifier overflow has been so high that a substantial extra burden has been placed on the filter station requiring the use of an excessive amount of filter aid to produce clear solutions, reducing the length of the filter cycles between cleaning operations, and requiring frequent washing of the filters with discard of the trona solution contained in the filter, loss of trona values, etc.

A further complication is that in order to produce soda ash crystals of saleable size it is necessary to use a crystal growth promoting additive in the crystallizers and that the presence of any excess of a flocculating agent in the liquors going to the crystallizers interferes with the operation of the crystal growth promoting additive and tends to produce fine crystals of sodium sesquicarbonate in the crystallizers which when calcined to soda ash produce a fine particle size soda ash which is not readily saleable.

One of the objects of this invention is therefore to provide a process for producing soda ash from crude trona in which the fine colloidal particles of shale and other insolubles in the trona solution may be more readily flocculated and settled therefrom without interfering with the production of crystals of sodium sesquicarbonate from the trona solution of a size which when calcined, produce soda ash crystals which are readily saleable.

Another object of the invention is to facilitate filtration of the trona solutions, extend the length of the filter cycles and reduce the loss of trona values in the filter washing operations.

Another object of the invention is to eliminate entirely the necessity for a filtering operation and thereby in addition to the object just recited above, bring about a reduction in processing costs.

Another object of this invention is to provide a method of producing purified soda ash of large crystal size from crude trona in which the flocculating agent used to clarify the crude trona solution does not interfere with the operation of the crystal growth promoting agent in the crystallization step and the crystal growth promoting agent does not interfere with the operation of the flocculating agent in the trona solution clarification step.

Various other objects and advantages of the invention will become apparent as this description proceeds.

Referring now to the drawings—

FIG. 1 illustrates diagrammatically one form of cyclical process for the production of soda ash from crude trona, and FIG. 2 is a diagram illustrating the transmittancy vs. settling time of trona clarifier solutions using various flocculants.

As illustrated in FIG. 1 the crude trona removed from the mine is preferably crushed to minus 8 mesh and introduced into insulated dissolving tanks 1 in which it is contacted with recycling mother liquor from line 2, which has been reheated to about 100° C. in heater 3. From the dissolvers 1 the trona solution carrying insoluble material therein flows into insulated clarifiers 4 in which most of the mud and slime settles out and is removed through the underflow line 5. Makeup water is introduced at 6 and the somewhat diluted underflow goes into insulated thickener 7 from the bottom of which the sludge is discharged to waste and the overflow, containing trona values dissolved by the makeup water, and the now softened makeup water flows through the line 8 and is added to the recycle mother liquor flowing into the heater 3. The makeup water having an average hardness of about 270 p.p.m. calculated as calcium carbonate, in contact with the trona insolubles in thickener 7 is softened to a hardness of about 56 p.p.m. by exchange of sodium for calcium in the thickener 7 and the precipitated calcium carbonate is discharged from the system with the sludge.

Sulfide, preferably in the form of sodium sulfide or sodium hydrosulfide is added, as indicated at 9, to the crude trona solution flowing from the dissolvers 1 in an amount sufficient to maintain the sulfide concentration in the recycle mother liquid high enough to precipitate any iron dissolved from the crude trona which is precipitable at the temperature of the hot solution (about 97° C.) and to leave sufficient residual sulfide ion concentration in the plant liquor to depress the iron solubility and prevent further precipitation of iron in the crystallizers, where the temperature of the trona solution is reduced to about 45° C. to precipitate sodium sesquicarbonate crystals therefrom. This normally requires maintaining a sulfide ion concentration of between 200 and 400 parts per million (p.p.m.) in the plant liquor solution based upon the weight of the solution, although this amount may vary between 100 and 1000 p.p.m.

In the clarifier 4 a flocculant is introduced, through the line 10, into the feed from the dissolvers in the center well 11 of the clarifier. The flocculant is preferably introduced in just the right amount to flocculate, settle and remove the colloidally fine slime in the trona solution and be substantially completely removed with the slime, as we have found that any flocculant remaining in the trona solution interferes with the operation of the crystallization promoter added at the crystallizers and tends to produce fine crystals. The flocculants we have found most satisfactory are hydrophylic colloids produced from the seeds of *Certonia silique*, *Certonia tetragonoloba*, *Cyamopsis tetragonoloba* and other leguminous seeds. In general all the cold water soluble gums of high viscosity prepared from guar seeds and similar synthetic materials, such as high molecular weight polyacrylamides and hydrolized polyacrylonitriles, are useful in our process. One desirable form of such flocculant is sold under the name "Burtonite 78" by the Burtonite Company, Nutley 10, New Jersey. It is introduced into the center well of the clarifier in the form of a 0.034% solution in water and is added in an amount preferably to provide ½ to 1½ p.p.m. of "Burtonite 78" in the trona solution in the clarifier 4. This small amount is sufficient to greatly improve the clarification of the trona solution in the clarifiers, and yet be completely removed in the clarifiers, and we have found that larger amounts which are carried beyond the clarifiers and into the stream of filtered trona solution, such as for example, 5 p.p.m., reduces the size and alters the crystal habit of the sesquicarbonate crystals formed in the crystallizers. Other flocculants than "Burtonite 78" may be used as hereinafter described.

The clarified trona solution overflowing from the weir 4a of the clarifier 4, flows through the line 12 to the filter station 13. A filter aid is introduced prior to filtration as indicated at 14 and after filtration the hot trona solution flows through the line 15 to the vacuum crystallizers 16, 17 and 18 where the temperature of the solution is reduced to about 45° C. to crystallize sodium sesquicarbonate therefrom. Just prior to introduction into the crystallizer system an anionic crystallization promoter preferably from the group consisting of (1) alkyl benzene sulfonates containing at least 8 alkyl carbon atoms, (2) alkyl naphthalene sulfonates containing at least 4 alkyl carbon atoms, (3) primary alkyl alcohol sulfates containing at least 10 carbon atoms and (4) N-substituted taurines of the formula $R'R''NCH_2CH_2SO_3M$ where $R'$ is a hydrocarbon radical, $R''$ is the acyl radical of a higher fatty acid and $M$ is an alkali metal, and a defoaming agent is added as indicated at 19. Other anionic crystallization promoting agents may, however, be used. The crystallization promoter is preferably used in amounts of 5 to 100 p.p.m. and increases the particle size of the sodium carbonate produced from about 40% plus 100 mesh to above 70% (preferably above 80%) plus 100 mesh.

From the last crystallizer the crystal slurry goes to a centrifuge station 20 where the crystals of sodium sesquicarbonate are separated from the mother liquor and the mother liquor is recycled through the lines 21 and 2 to the heater 3 where it is reheated and used to dissolve more crude trona. In order to maintain the proper balance of sodium carbonate to sodium bicarbonate in the recirculating mother liquor, a portion of the recirculating mother liquor may be withdrawn and discarded, or processed in other ways to recover the soda values therein, as indicated at 23. From the centrifuge station 20 the sodium sesquicarbonate crystals are conveyed to calciners 22 where they are calcined to soda ash. It is to be understood that the overall process has been described only in a diagrammatic way, that many details have been omitted for the sake of clarity and that where only one dissolver, one clarifier, one filter, etc., have been indicated, multiples of such units may be used.

SULFIDE ION CONCENTRATION

In the process as described, the sulfide introduced at 9 being completely soluble in the trona solution, remains in the solution throughout the cycle, except for that portion consumed in the precipitation and removal of iron in the dissolvers 1, clarifiers 4 and filters 13, and the amount lost by volatilization from the hot plant liquors and in liquors lost or discarded from the system. Sufficient sulfide ion concentration must be maintained in the trona solution at the point of crystallization of the sodium sesquicarbonate therefrom to depress the iron solubility at this point to prevent iron from crystallizing out of the solution and depositing on the sesquicarbonate crystals during the temperature drop from about 95° C. to about 45° C. in the crystallizer system. As stated above, this requires the maintenance preferably of about 300 to 400 p.p.m. of sulfide in the process liquors at the point of sesquicarbonate crystallization, although from 100 to 1000 p.p.m. may be used. The typical concentration of sulfide in the trona solution is as follows: in the clarifiers 4, 325–400 p.p.m. In the stream 12 to the filters, 325–400 p.p.m. In the stream 15 to the crystallizers, 325–400 p.p.m. In the recycle mother liquor, 225–275 p.p.m. Added at 9, 120–160 p.p.m.

The sulfide concentration, while used primarily to depress iron solubility in the filtered trona solution and prevent iron precipitation with the sesquicarbonate crystals, is present at all times in the process liquors and may to some extent affect the operation of the other additives to the process, such as the flocculant, the filter aid, the crystal growth promoters and the defoaming agents.

THE FLOCCULATING AGENTS

The flocculating agent acts to flocculate and assist in the removal of the fine fraction of the trona insolubles whose downward forces in the clarifiers are only slightly greater than the upward forces of the flowing liquor which flows through the clarifiers at a rate of about 1200 gallons overflow per minute. The minus 200 mesh fraction of the trona insolubles amounts to over 30% of the total weight of the insoluble material and if most of these fine insolubles are not removed in the clarifiers, they quickly clog the filters, reducing the length of the filter cycle, requiring frequent washing of the filter leaves and lead to a high loss of trona values in the discarded trona solution in the filters. However, a slight excess of the flocculating agent remaining in the filtered trona solution interferes with the operation of the crystal growth promoters added in the crystallization operation and leads to the production of undesirably fine sesquicarbonate crystals, and hence undesirably fine soda ash, so that it is desirable to use just enough for the flocculating agent to produce clarity in the clarifier overflow and leave no residual flocculating agent in the process liquors.

When using hydrophylic colloids from the seeds of *Certonia tetragonoloba* and other leguminous seeds, such as "Burtonite 78", this amount is from from .5 to 1.5 p.p.m. and the use of larger amounts leads to a reduction in the size of the sesquicarbonate crystals produced.

The following is a screen analysis of sodium sesquicarbonate crystals produced from trona solutions with various amounts of "Burtonite 78" and "Jaguar 507" as flocculating agents and dodecyl benzene sulfonate as a crystal growth promoter under laboratory conditions.

*Table I*

| Sample | Percent +40 Mesh | Percent +60 Mesh | Percent +100 Mesh | Percent −100 Mesh |
|---|---|---|---|---|
| No additive | 6.1 | 14.2 | 30.2 | 69.8 |
| 1 p.p.m. Burtonite 78 | 7.1 | 20.8 | 51.3 | 48.7 |
| 5 p.p.m. Burtonite 78 | 2.1 | 13.4 | 45.4 | 54.6 |
| 10 p.p.m. Burtonite 78 | 3.7 | 20.1 | 56.0 | 44.0 |
| 100 p.p.m. dodecyl benzene sulfonate | 26.9 | 47.8 | 73.7 | 26.3 |
| 1 p.p.m. Burtonite +100 p.p.m. dodecyl benzene sulfonate | 23.8 | 49.5 | 77.7 | 22.3 |
| 5 p.p.m. Burtonite +100 p.p.m. dodecyl benzene sulfonate | 17.2 | 39.5 | 67.1 | 32.9 |
| 10 p.p.m. Burtonite +100 p.p.m. dodecyl benzene sulfonate | 14.6 | 39.9 | 62.5 | 37.5 |

*Table II*

| Sample | Percent +40 Mesh | Percent +60 Mesh | Percent +100 Mesh | Percent −100 Mesh |
|---|---|---|---|---|
| No additive | 6.1 | 14.2 | 30.2 | 69.8 |
| 1 p.p.m. Jaguar 507 | 8.1 | 21.0 | 32.1 | 62.9 |
| 5 p.p.m. Jaguar 507 | 5.0 | 18.3 | 42.7 | 57.3 |
| 10 p.p.m. Jaguar 507 | 3.8 | 24.6 | 55.7 | 44.3 |
| 100 p.p.m. dodecyl benzene sulfonate | 26.9 | 47.8 | 73.7 | 26.3 |
| 1 p.p.m. Jaguar+100 p.p.m. dodecyl benzene sulfonate | 18.3 | 41.1 | 69.5 | 30.5 |
| 5 p.p.m. Jaguar +100 p.p.m. dodecyl benzene sulfonate | 2.7 | 15.3 | 39.9 | 60.1 |
| 10 p.p.m. Jaguar +100 p.p.m. dodecyl benzene sulfonate | 4.3 | 19.2 | 39.9 | 60.1 |

"Jaguar 507" is a natural hydrophylic colloid made of refined guar gum sold by Stein Hall & Company, Inc., New York, New York. "Jaguar 506" is the same material chemically as "Jaguar 507" but differs therefrom in physical properties.

It will be noted from the above tables that while "Burtonite 78" and dodecyl benzene sulfonate or "Jaguar 507" and dodecyl benzene sulfonate used alone improve the crystal size, there is an antagonistic effect when used together, and the amount of flocculant which is used must be limited to the order of 1 p.p.m. to avoid reduction in the size of the sodium sesquicarbonate crystals produced.

Other flocculants may be used, such as other hydrophylic colloids from the seeds of leguminous plants, such as the water gums from guar seeds, highly polymerized saccharide complexes of marmose and galactose sugars and high molecular weight polyacrylamides and hydrolized polyacrylonitriles. When synthetic materials of high molecular weight are used these produce rapidly settling coagulated insolubles in the clarifiers which can be likened to a rubber mass. Good dispersions of the synthetic flocculants are difficult to produce and small traces remaining in the clarifier overflow liquor will alter the crystal habits of the sesquicarbonate and produce finer size crystals.

FIG. 2 illustrates the transmittancy of trona clarifier overflow solution vs. settling time using 1 p.p.m. of various flocculants as compared to the transmittance of a blank clarifier solution without an additive. In this illustration Separan NP is a high molecular weight polymer of acrylamide made by Dow Chemical Company, and S 3171 and S 3216 are high molecular weight polyacrylamides made by American Cyanamid Company. Other hydrophylic colloids from plant seeds which may be used are Jaguar guar gum, Jaguar MD–C, Jaguar MD–1, sold by Stein Hall and Company, Floc 144, sold by Hodag Chemical Company, Chicago, Illinois, and Guartec, a starch of the galactomannen type prepared from guar flour, sold by General Mills, Inc., Minneapolis, Minnesota. The best flocculants appear to be naturally occuring materials from the seeds of leguminous plants.

In plant operations the use of "Burtonite 78" in the amount of approximately 1 p.p.m. in the clarifiers has produced clarifier overflow solution averaging 95% light transmittance, as measured by the use of standard electrophotometric measurements against the transmittancy of water rated at 100% light transmittancy.

The use of approximately 1 p.p.m. of "Burtonite 78" as a flocculant in the clarifiers has also produced the following improvement in filter operations as compared with eight months of plant operation previous to its use.

*Table III*

| | Ave. Filter Flow, g.p.m. | Ave. Percent Light Trans. Clarifier | | Average Daily Filter Cycles | Average Gallons Per Filter Cycle |
|---|---|---|---|---|---|
| | | A | B | | |
| By Months: | | | | | |
| 1st month | 1,588 | 80 | 83 | 32 | 74,400 |
| 2nd month | 1,645 | 88 | 88 | 23 | 101,800 |
| 3rd month | 1,662 | 87 | 87 | 21 | 106,000 |
| 4th month | 1,707 | 90 | 88 | 25 | 97,300 |
| 5th month | 1,623 | 87 | 84 | 27 | 86,400 |
| 6th month | 1,634 | 84 | 78 | 34 | 68,700 |
| 7th month | 1,508 | 86 | 80 | 30 | 71,900 |
| 8th month | 1,640 | 79 | 77 | 40 | 58,100 |

Use of 1 p.p.m. of "Burtonite 78" begun

| By Days: | | | | | |
|---|---|---|---|---|---|
| 1st day | 1,268 | 94 | 91 | 14 | 130,300 |
| 2nd day | 1,922 | 93 | 89 | 26 | 106,800 |
| 3rd day | 2,273 | 95 | 94 | 15 | 218,000 |
| 4th day | 2,400 | 95 | 95 | 20 | 172,800 |
| 5th day | 2,360 | 95 | 92 | 20 | 170,000 |
| 6th day | 2,395 | 95 | 93 | 20 | 172,400 |
| 7th day | 2,110 | 97 | 94 | 15 | 202,000 |
| 8th day | 2,015 | 97 | 94 | 13 | 222,000 |
| 9th day | 1,990 | 97 | 95 | 9 | 318,000 |
| 10th day | 2,213 | 97 | 96 | 12 | 265,500 |

This shows an average reduction in filter cycles from about 30 cycles per day to about 16 cycles per day. In each filter washing 900 gallons of clarified filtrate is lost so that trona filtrate losses are reduced about one half. In addition the amount of filter aid required, with the improved clarifier overflow, is reduced about one half and the amount of filtered solution going to the crystallizers is increased by more than 100,000 gallons per filter cycle.

When the amount of flocculant used is of the order of 0.5 to 1.5 p.p.m. no residual flocculant is carried through the filter and into the filtered trona stream going to the crystallizers so that when the crystal growth promoters are added at the entrance to the crystallizers there is no antagonistic effect and the desired size of sodium sesquicarbonate crystals may be produced in the crystallizers.

Under favorable operating conditions, with a clarifier overflow averaging 95% light transmittancy, it is possible to omit the filtering operation entirely, thereby saving the entire equipment and operating cost of the filter station. In such an operation the clarifier overflow is passed directly to the line 15 flowing into the crystallizers, through the line 12a, and the filter 13 is omitted. By careful control of the amount of flocculant used the flocculant can substantially all be removed in the clarifier underflow and no residual flocculant is carried into the crystallizers.

CRYSTALLIZATION PROMOTERS

At the entrance to the crystallizers a crystal growth promoter capable of modifying the crystallization habit and of increasing the size of the sesquicarbonate crystals is introduced into the filtered trona solution and in addition, an anti-foaming agent, such as Emcol, a diglycol laurate is introduced to reduce foaming in the crystallizers. Any other non-ionic long chain fatty acid ester containing multiple ether linkages and capable of reducing foaming, however, may be used. At this point, in addition to the normal soluble impurities in the trona, the solution contains also from 300 to 400 p.p.m. of sulfide ions and some dissolved organics, but is preferably free of any trace of the flocculant used in the clarifiers.

The preferred crystallization additives are (1) alkyl benzene sulfonates containing at least 8 alkyl carbon atoms, (2) alkyl naphthalene sulfonates containing at least 4 alkyl carbon atoms, (3) primary alkyl alcohol sulfates containing at least 10 carbon atoms and (4) N-substituted taurines of the formula $R'R''NCH_2CH_2SO_3M$ where $R'$ is a hydrocarbon radical, $R''$ is the acyl radical of a higher fatty acid and $M$ is an alkali metal, although other anionic crystallization promoting additives may be used. The use of such crystal growth promoting additives is described in more detail in application Serial No. 474,828, filed December 13, 1954, now Patent No. 2,954,282.

For crystallizing sodium sesquicarbonate the additive is preferably used in amounts of about 5 to about 100 p.p.m. and its use increases the size of soda ash produced from the sodium sesquicarbonate crystals in plant practice from an average of less than 40% plus 100 mesh to an average of over 80% plus 100 mesh. The crystallization promoting additive remaining in the mother liquor solution is returned to the dissolvers 1 where in contact with the crude trona it is adsorbed on the insoluble particles of the trona and is completely removed from the cycling mother liquor system with the sludge discharged to waste in the thickener underflow. Tests with radio active carbon tagged crystallization promoters show that the crystallization promoters are substantially completely removed from the system before the time the freshly dissolved trona solution reaches the overflow from clarifiers 4.

Operating in this way the crystallization additives do not interfere with the operation of the flocculants and by the complete removal of the flocculants from the filtered trona solution the flocculants do not interfere with the operation of the crystallization additives in promoting the growth of larger sodium sesquicarbonate crystals from which larger soda ash crystals are produced.

EXAMPLE

For the production of one thousand tons of finished soda ash, 3,380,000 lbs. of crude trona, consisting of 3,100,000 lbs. of sodium sesquicarbonate and 280,000 lbs. of insolubles is added to dissolver 1 along with 22,000,000 lbs. of mother liquor of the following approximate composition and 340,000 lbs. of steam to keep the mixture hot.

MOTHER LIQUOR COMPOSITION

| Constituent: | Percent |
| --- | --- |
| $Na_2CO_3$ | 17.86 |
| $NaHCO_3$ | 4.72 |
| $NaCl$ | 0.27 |
| $Na_2SO_4$ | 0.140 |
| $NaHS$ | 0.0445 |
| $Fe_2O_3$ | 0.0004 |
| $H_2O$ | 77.0 |

After dissolving the soluble portion of the trona, 3,500 lbs. of makeup sulfide ion is added at 9 in the form of sodium bisulfide, thus bringing the NaHS concentration up to 0.064% (365 p.p.m. sulfide). When the solution is pumped to the clarifier 4, 30 lbs. of flocculant is added in the form of a dilute solution to obtain good dispersion. The insolubles are allowed to settle and are removed at 5. To remove the last traces of insoluble material the solution is filtered at 13 and sent to the crystallizers 16, 17, 18. At this point there remains 25,160,000 lbs. of solution of the following approximate composition.

| Constituent: | Percent |
| --- | --- |
| $Na_2CO_3$ | 21.1 |
| $NaHCO_3$ | 8.6 |
| $NaCl$ | 0.25 |
| $Na_2SO_4$ | 0.13 |
| $NaHS$ | 0.064 |
| $Fe_2O_3$ | 0.0003 |
| $H_2O$ | 69.86 |

To the liquor going to the crystallizers 300 lbs. (12 p.p.m.) of the sodium salt of dodecyl-benzene-sulfonic acid and sufficient defoamer to prevent foaming is added at 19. By evaporating 1,930,000 lbs. of water vapor through vacuum cooling in the crystallizers 16, 17 and 18 the solution is cooled from approximately 95° C. to 45° C. and 2,770,000 lbs. of sodium sesquicarbonate crystals are precipitated. These are separated in centrifuge 20, and calcined in 22 with the adhering mother liquor to produce 1,000 tons of soda ash having the following chemical and physical characteristics:

| | |
| --- | --- |
| Bulk density | lbs./ft.³ 49 |
| Percent plus 30 mesh | 2.0 |
| Percent plus 100 mesh | 83.0 |
| Percent minus 200 mesh | 1.5 |
| $Na_2CO_3$ (equiv.) | percent 99.7 |
| $NaHCO_3$ | .25 |
| $NaCl$ | percent 0.04 |
| $Na_2SO_4$ | do 0.03 |
| $Fe_2O_3$ | p.p.m. 10 |
| Insolubles | percent .01 |
| Ign. loss | do 0.19 |

The mother liquor is recycled to the dissolvers and makeup water is added at 8 to maintain the volume of the system.

While we have described a preferred operation of a process for producing soda ash from crude trona it will be understood that various modifications and changes may be made in the process described without departing from the spirit of our invention or the scope of the following claims.

We claim:

1. In a cyclical system of producing soda ash from crude trona the process which comprises dissolving crude trona containing insoluble material therein in a heated recycling mother liquor, clarifying the crude trona solution by adding a flocculating agent for the insoluble material therein in an amount from 0.5 to 5 p.p.m., which flocculating agent is incompatible with the crystallization promoter later used in said method, and settling and removing the insoluble material and substantially completely removing the flocculating agent with the insoluble material, adding a crystallization promoter to the hot trona solution and cooling to crystallize sodium sesquicarbonate crystals therefrom, separating the sesquicarbonate crystals from the trona mother liquor, calcining the sesquicarbonate crystals to soda ash, recycling and reheating the mother liquor and dissolving more crude trona therein and removing the residual crystallization promoter from the crude trona solution with the insoluble material.

2. In a cyclical system of producing soda ash from crude trona the process which comprises dissolving crude trona containing insoluble material therein in a heated recycling mother liquor, clarifying the crude trona solution by adding a flocculating agent from the group consisting of hydrophylic colloids from the seeds of leguminous plants, highly polymerized saccharide complexes of marmose and galactose and high molecular weight polyacrylamides and hydrolized polyacrylonitriles in an amount of less than 5 p.p.m. of the crude trona solution which flocculating agent is incompatible with the crystallization promoter later used in said method and settling, removing the insolubles and substantially completely removing the flocculating agent from the hot trona solution, adding a crystallization promoter in an amount of 5 to 100 p.p.m. to the hot trona solution and cooling to crystallize sodium sesquicarbonate crystals therefrom, separating the sesquicarbonate crystals from the trona mother liquor, calcining the sesquicarbonate crystals to soda ash, recycling and reheating the mother liquor and dissolving more crude trona therein and removing the residual crystallization promoter from the crude trona solution with the insolubles.

3. In a cyclical system of producing soda ash from crude trona the process which comprises dissolving crude trona containing insoluble material therein in a heated recycling mother liquor, adding a soluble sulfide ion containing material to the trona solution in an amount to maintain a sulfide ion concentration of between 100 and 1000 p.p.m. in the circulating plant liquors, adding a flocculating agent in an amount of 0.5 to 5 p.p.m. of the crude trona solution which flocculating agent is incompatible with the crystallization promoter later used in said method and clarifying and removing insoluble material and substantially completely removing the flocculating agent from the trona solution, adding makeup water to the insoluble material to remove further trona values therefrom, separating the insoluble material and the added makeup solution and adding the makeup solution to the recycling mother liquors, adding a crystallization promoter from the group consisting of (1) alkyl benzene sulfonates containing at least 8 alkyl carbon atoms, (2) alkyl naphthalene sulfonates containing at least 4 alkyl carbon atoms, (3) primary alkyl alcohol sulfates containing at least 10 carbon atoms and (4) N-substituted taurines of the formula R'R''NCH$_2$CH$_2$SO$_3$M where R' is a hydrocarbon radical, R'' is the acyl radical of a higher fatty acid and M is an alkali metal to the hot trona and cooling to crystallize sodium sesquicarbonate crystals therefrom, separating the sesquicarbonate crystals from the trona mother liquor, calcining the sesquicarbonate crystals to soda ash, recycling and reheating the mother liquor and dissolving more crude trona therein and removing the residual crystallization promoter from the crude trona solution with the insoluble material separated therefrom.

4. In a cyclical system of producing soda ash from crude trona the process which comprises dissolving crude trona containing insoluble material therein in a heated recycling mother liquor, adding a soluble sulfide ion containing material to the trona solution, adding a soluble gum from guar seeds in an amount of 0.5 to 5 p.p.m. of the crude trona solution as a flocculating agent which flocculating agent is incompatible with the crystallization promoter later used in said method and clarifying and removing insoluble material and substantially completely removing the flocculating agent from the trona solution, adding makeup water to the insoluble material to remove further trona values therefrom, separating the insoluble material and the added makeup solution and adding the makeup solution to the recycling mother liquors, filtering the hot trona solution, adding a crystallization promoter from the group consisting of (1) alkyl benzene sulfonates containing at least 8 alkyl carbon atoms, (2) alkyl naphthalene sulfonates containing at least 4 alkyl carbon atoms, (3) primary alkyl alcohol sulfates containing at least 10 carbon atoms and (4) N-substituted taurines of the formula R'R''NCH$_2$CH$_2$SO$_3$M where R' is a hydrocarbon radical, R'' is the acyl radical of a higher fatty acid and M is an alkali metal to the filtered hot trona and cooling to crystallize soduim sesquicarbonate crystals therefrom, separating the sesquicarbonate crystals from the trona mother liquor, calcining the sesquicarbonate crystals to soda ash, recycling and reheating the mother liquor and dissolving more crude trona therein and removing the residual crystallization promoter from the crude trona solution with the insoluble material separated therefrom.

5. In a cyclical system of producing soda ash from crude trona the process which comprises dissolving crude trona containing insoluble material therein in a heated recycling mother liquor, clarifying the crude trona solution by adding a flocculating agent for the insoluble material therein consisting of a water soluble gum prepared from guar seeds in an amount of from 0.5 to 1.5 p.p.m. of the crude trona solution which flocculating agent is incompatible with the crystallization promoter later used in said method and settling, removing the insolubles and substantially completely removing the flocculating agent from the hot trona solution, adding a crystallization promoter to the hot trona solution and cooling to crystallize sodium sesquicarbonate crystals therefrom, separating the sesquicarbonate crystals from the trona mother liquor, calcining the sesquicarbonate crystals to soda ash, recycling and reheating the mother liquor and dissolving more crude trona therein and removing the residual crystallization promoter from the crude trona solution with the insolubles.

6. In a cyclical system of producing soda ash from crude trona the process which comprises dissolving crude trona containing insoluble material therein in a heated recycling mother liquor, adding a soluble sulfide ion containing material to the trona solution, adding "Burtonite 78" as a flocculating agent in an amount of from 0.5 to 5 p.p.m. of the crude trona solution which flocculating agent is incompatible with the crystallization promoter later used in said method and clarifying and removing insoluble material and flocculating agent from the trona solution, adding makeup water to the insoluble material to remove further trona values therefrom, separating the insoluble material and the added makeup solution and adding the makeup solution to the recycling mother liquors, filtering the hot trona solution, adding a crystallization promoter consisting of dodecyl benzene sulfonate in an amount of 5 to 100 p.p.m. to the filtered hot trona and cooling to crystallize sodium sesquicarbonate crystals therefrom, separating the sesquicarbonate crystals from the trona mother liquor, calcining the sesquicarbonate crystals to soda ash, recycling and reheating the mother liquor and dissolving more crude trona therein and removing the residual crystallization promoter from the crude trona solution with the insoluble material separated therefrom.

7. In a cyclical system of producing soda ash from crude trona the process which comprises dissolving crude trona containing insoluble material therein in a heated recycling mother liquor, adding a soluble sulfide ion containing material to the trona solution in an amount to maintain a sulfide ion concentration of between 100 and 1000 p.p.m. in the circulating plant liquors, clarifying the crude trona solution by adding a flocculating agent for the insoluble material therein in an amount of from 0.5 to 5 p.p.m., which flocculating agent is incompatible with the crystallization promoter later used in said method and settling and removing the insoluble material and substantially completely removing the flocculating agent, adding a crystallization promoter to the hot trona solution and cooling to crystallize sodium sesquicarbonate crystals therefrom, separating the sesquicarbonate crystals from the trona mother liquor, calcining the sesquicarbonate crystals to soda ash, recycling and reheating the mother liquor and dissolving more crude trona therein and removing the residual crystallization promoter from the crude trona solution with the insoluble material while leaving a sulfide ion concentration of above 100 p.p.m. therein.

8. In a cyclical system of producing soda ash from crude trona the process which comprises dissolving crude trona containing insoluble material therein in a heated recirculating mother liquor, clarifying the crude trona solution by adding a flocculating agent for the insoluble material, in an amount from 0.5 to 5 p.p.m., which flocculating agent in incompatible with the crystallization promoter later used in said method, settling and substantially completely removing the insoluble material and the flocculating agent from the clarified trona solution, adding a crystallization promoter to the clarified trona solution, and crystallizing and separating sodium sesquicarbonate crystals therefrom and calcining to soda ash and recirculating the mother liquor, adding softened water, as makeup water, to the recirculating mother liquor stream and using the softened water and recirculating mother liquor to dissolve more trona.

References Cited in the file of this patent

UNITED STATES PATENTS

| | | |
|---|---|---|
| 2,644,762 | Frisch | July 7, 1953 |
| 2,788,257 | Duke | Apr. 9, 1957 |
| 2,792,282 | Pike | May 14, 1957 |
| 2,952,358 | Schoeld | Sept. 13, 1960 |
| 2,954,282 | Bauer | Sept. 27, 1960 |

FOREIGN PATENTS

| | | |
|---|---|---|
| 206,010 | Australia | July 5, 1956 |